US00RE43730E

(19) United States
(12) Reissued Patent
Pils et al.

(10) Patent Number: US RE43,730 E
(45) Date of Reissued Patent: Oct. 16, 2012

(54) PACIFIER

(75) Inventors: Reiner Pils, Kalbe (DE); Stephane Pottier, Bagnolet cedex (DE)

(73) Assignee: MAPA GmbH, Zeven (DE)

(21) Appl. No.: 29/395,561

(22) Filed: Feb. 16, 2012

Related U.S. Patent Documents

Reissue of:
(64) Patent No.: Des. 520,640
Issued: May 9, 2006
Appl. No.: 29/197,043
Filed: Jan. 8, 2004

(30) Foreign Application Priority Data

Jul. 10, 2003 (DE) ..... 000050471

(51) LOC (9) Cl. ..... 24-04
(52) U.S. Cl. ..... D24/194
(58) Field of Classification Search ..... D24/193–196, D24/199; 606/234–236; 215/11.1–11.6
See application file for complete search history.

(56) References Cited

U.S. PATENT DOCUMENTS 4,381,785 A * 5/1983 Robbins ..... 606/236
D285,839 S * 9/1986 Roehrig ..... D24/194
D303,839 S * 10/1989 Fitzpatrick et al. ..... D24/194
D312,312 S * 11/1990 Herritz ..... D24/194
D326,919 S * 6/1992 Geitner et al. ..... D24/194
D387,868 S * 12/1997 Wilburn ..... D24/194
D441,083 S * 4/2001 Roehrig ..... D24/194
6,241,110 B1 * 6/2001 Hakim ..... 215/11.1
D445,902 S * 7/2001 Luehne-Porath ..... D24/194
D450,127 S * 11/2001 Trujillo ..... D24/194
D541,422 S * 4/2007 Pils et al. ..... D24/194
D646,791 S * 10/2011 Pope ..... D24/194
8,066,738 B2 * 11/2011 Kliegman et al. ..... 606/234

* cited by examiner

*Primary Examiner* — Susan E Krakower
(74) *Attorney, Agent, or Firm* — Vidas, Arrett & Steinkraus, P.A.

(57) CLAIM

The ornamental design for a pacifier, as shown.

DESCRIPTION

FIG. 1 is a bottom plan view of a pacifier showing our new design;
FIG. 2 is a rear elevational view thereof;
FIG. 3 is a right elevational view thereof;
FIG. 4 is a front elevational view thereof;
FIG. 5 is a left elevational view thereof;
FIG. 6 is a top plan view thereof;
FIG. 7 is a perspective view thereof; and,
FIG. 8 is another perspective view.

1 Claim, 8 Drawing Sheets

Figure 1:
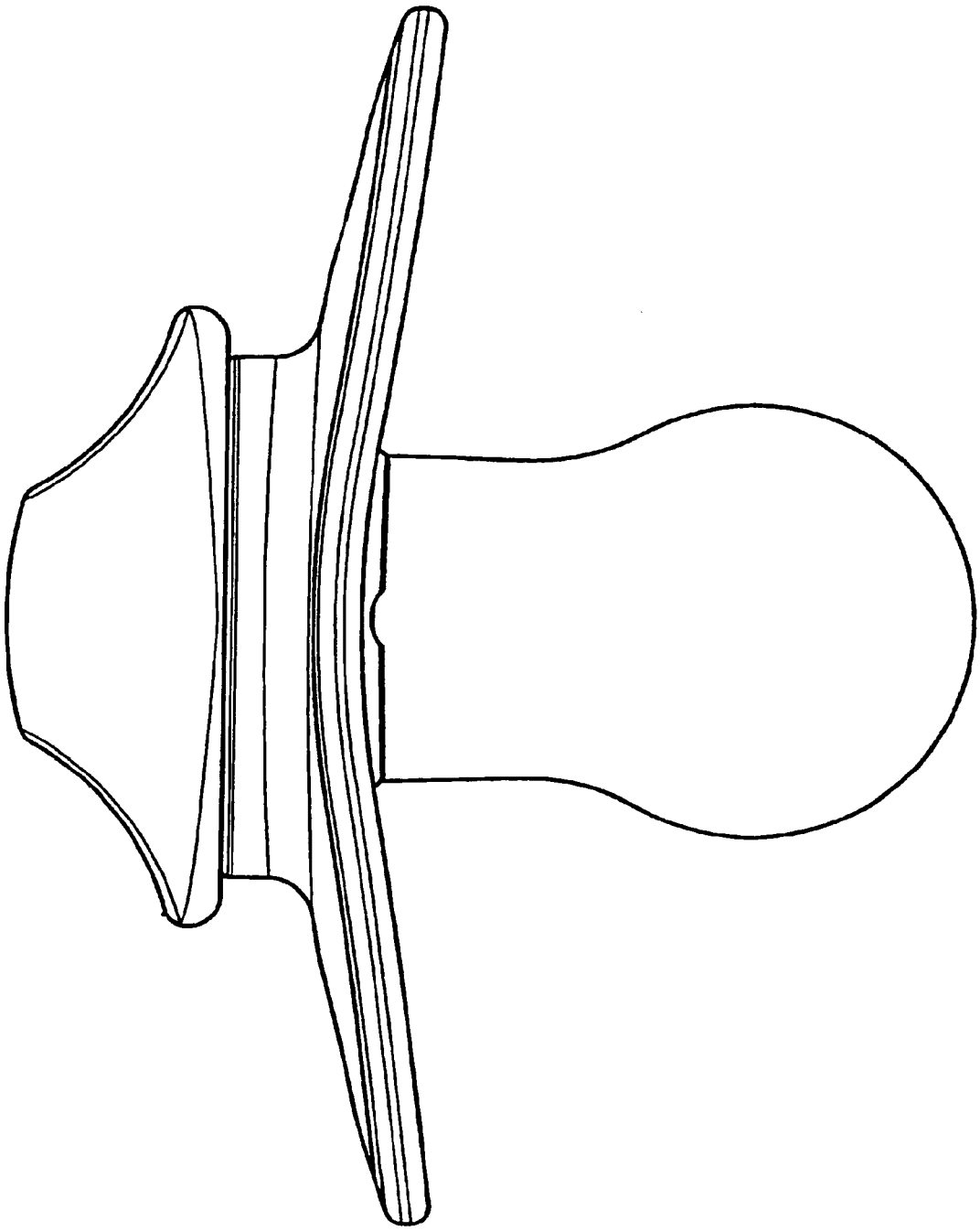
Figure 2:
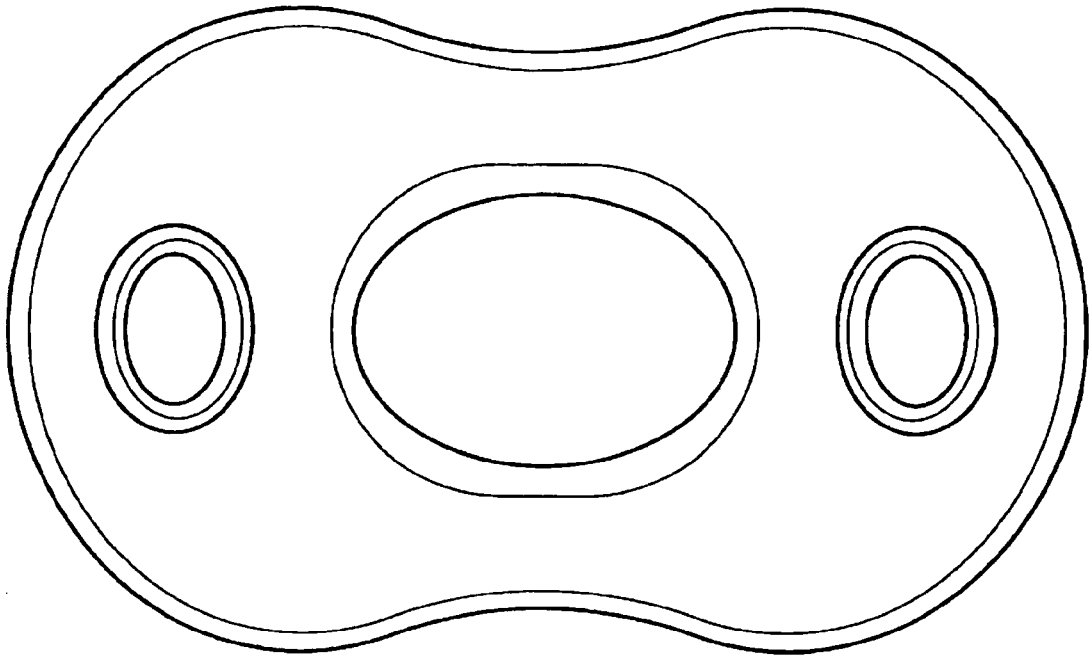
Figure 3:
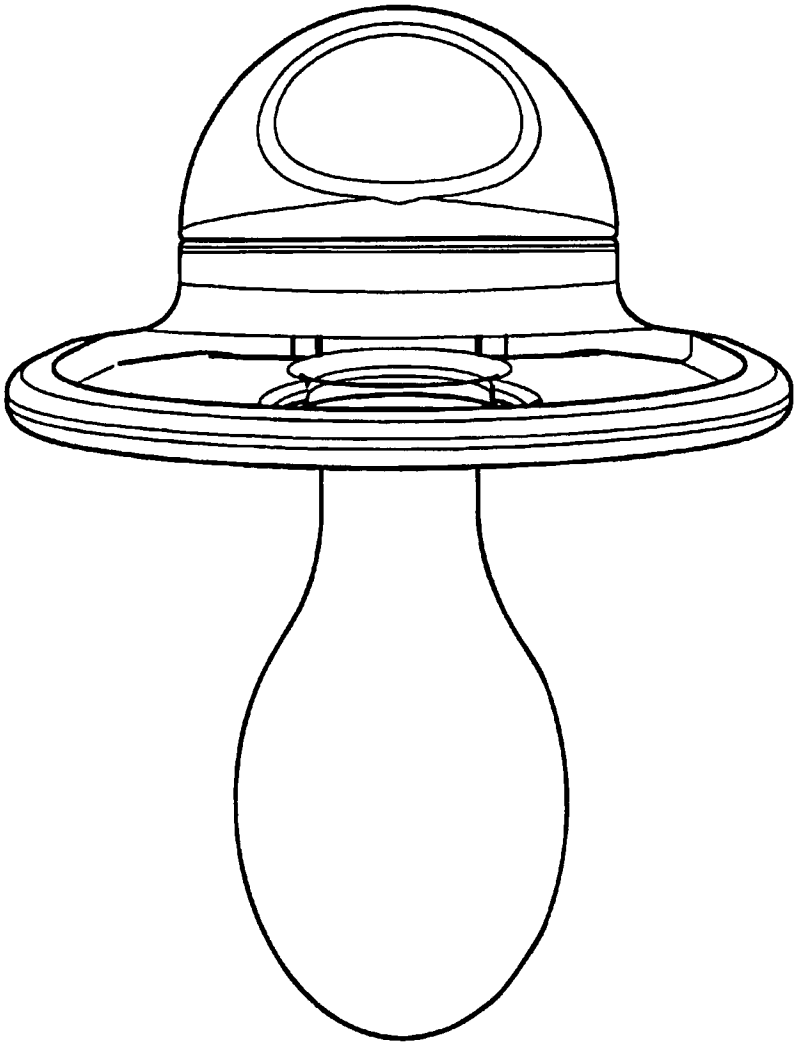
Figure 4:
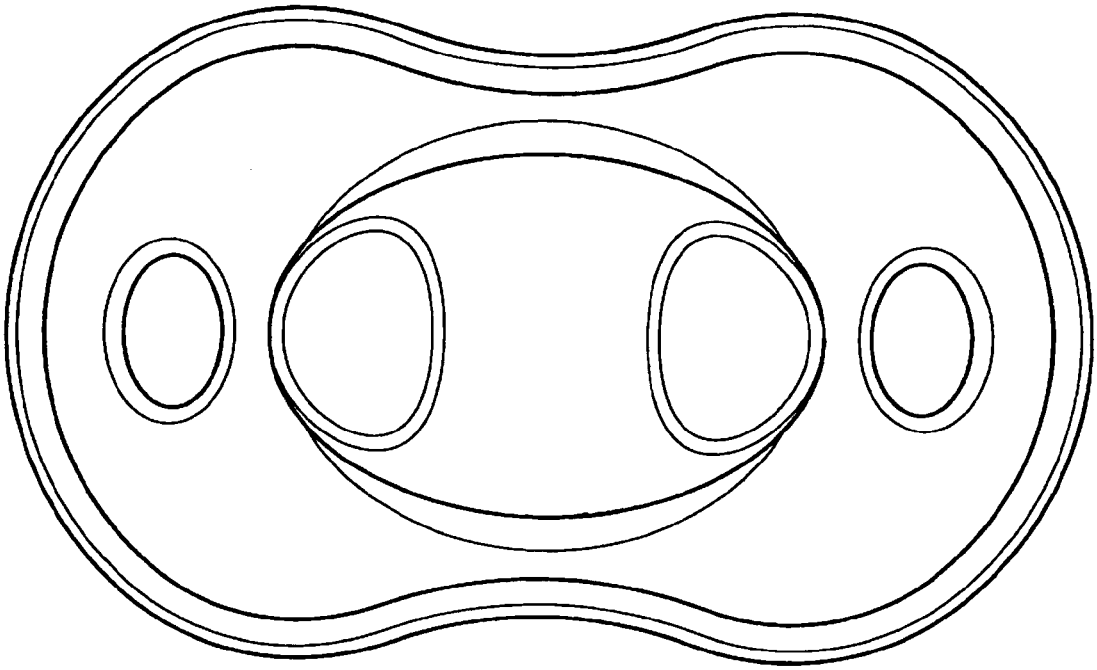
Figure 5:
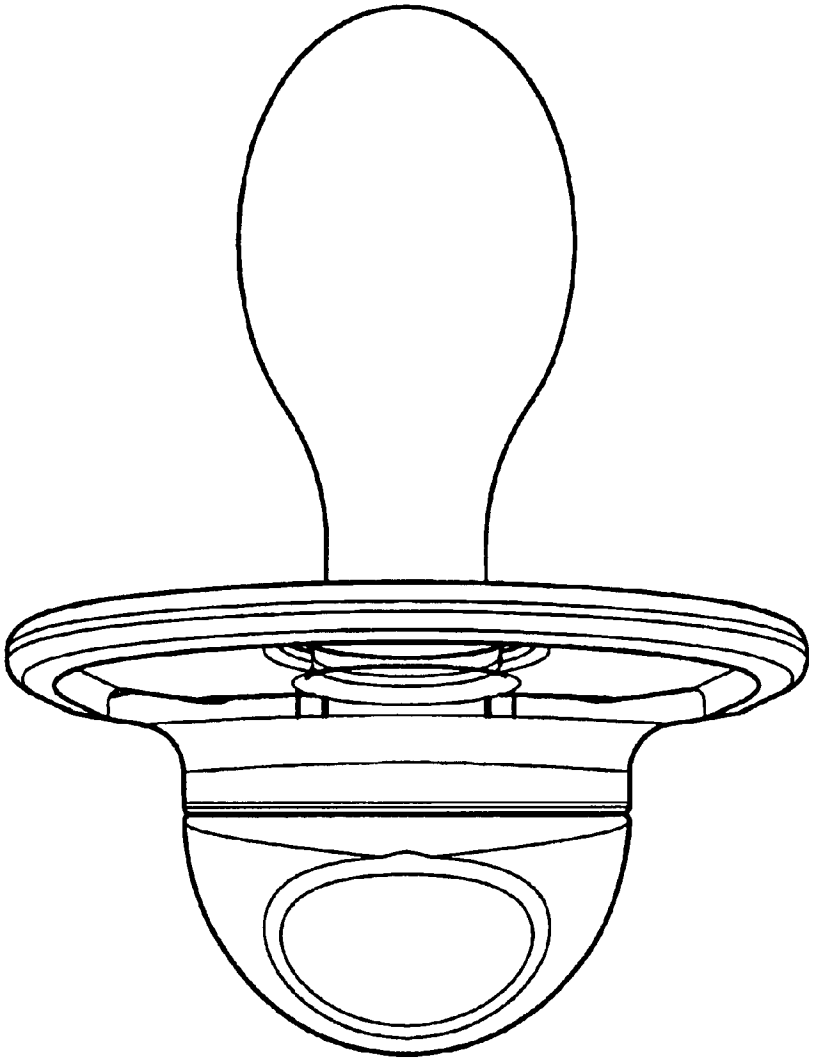
Figure 6:
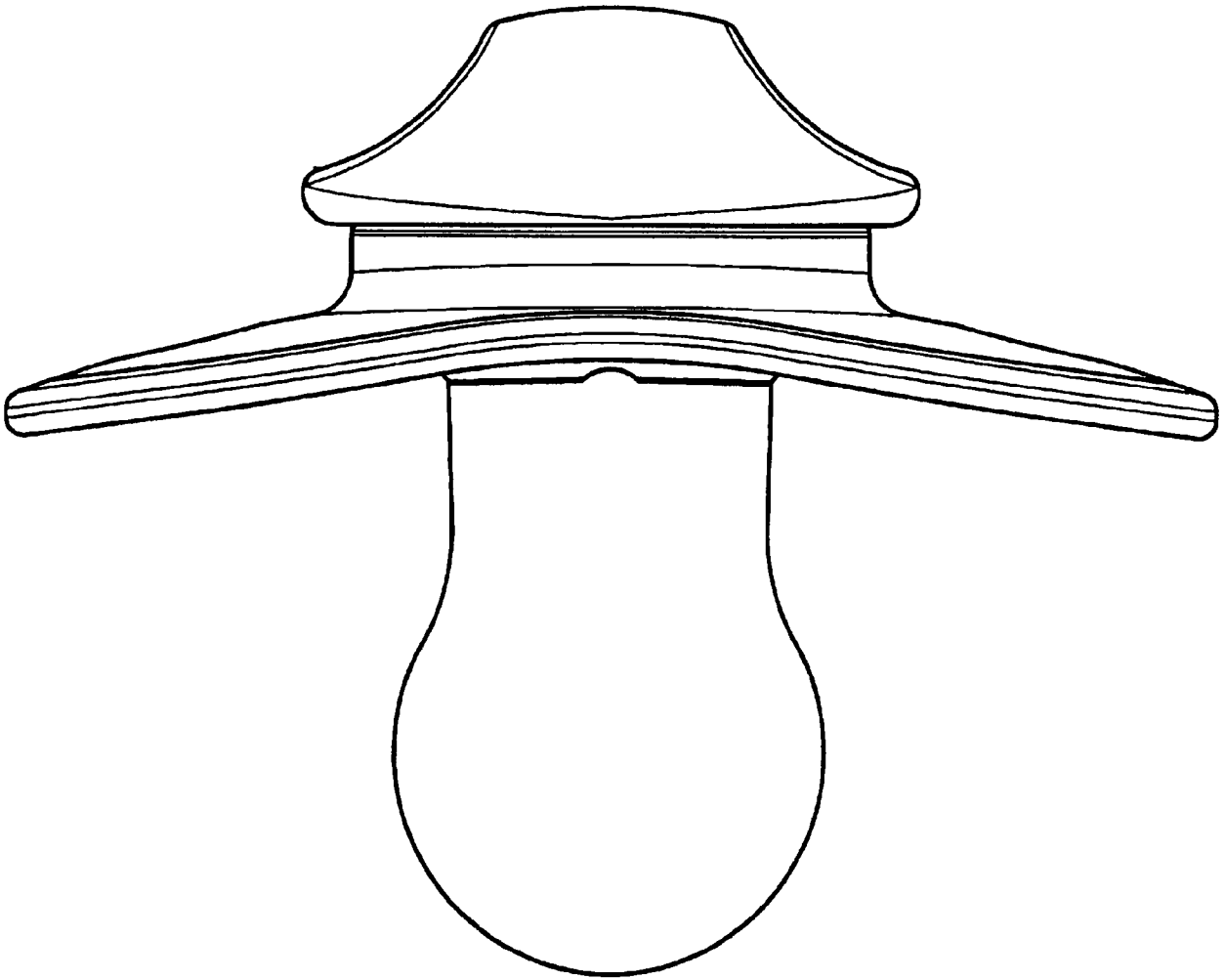
Figure 7:
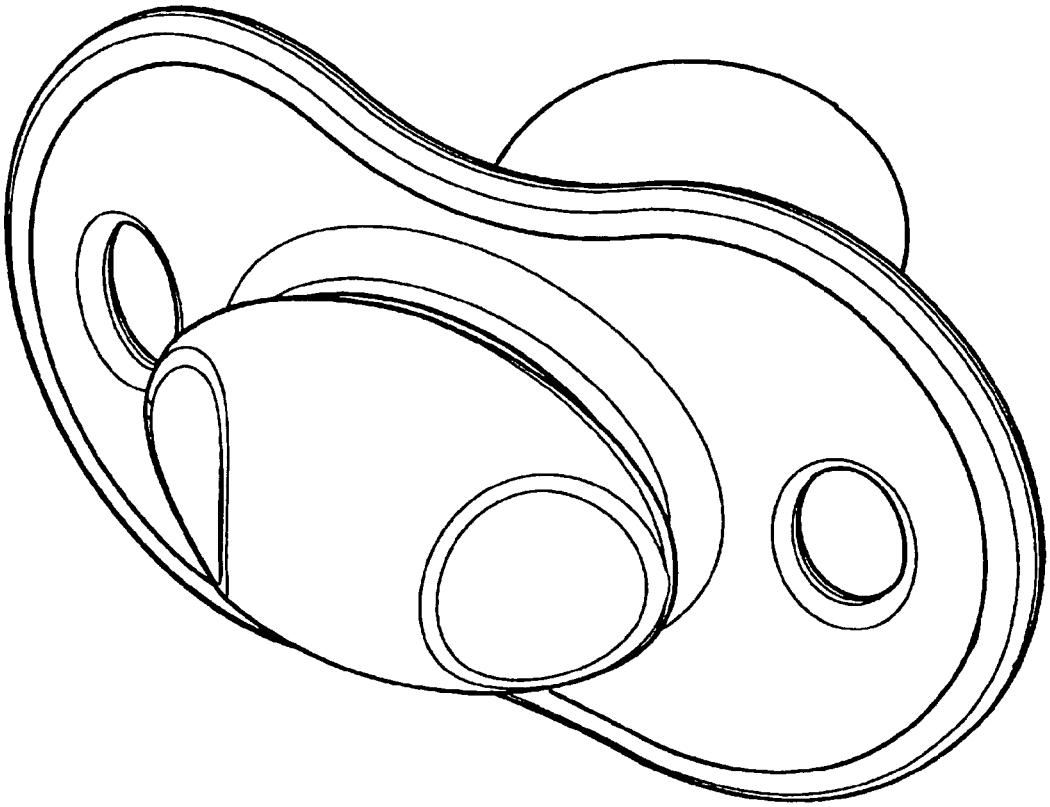
Figure 8:
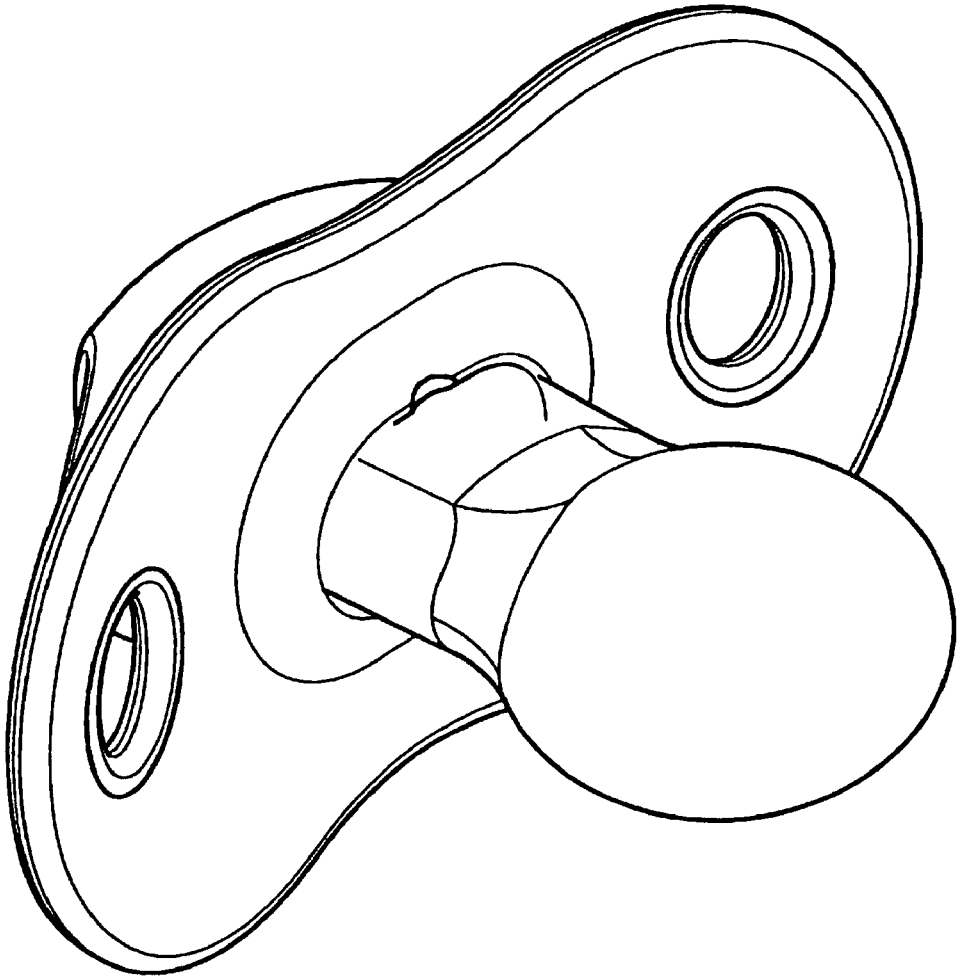

Matter enclosed in heavy brackets [ ] appears in the original patent but forms no part of this reissue; matter printed in italics indicates the additions made by reissue.